UNITED STATES PATENT OFFICE.

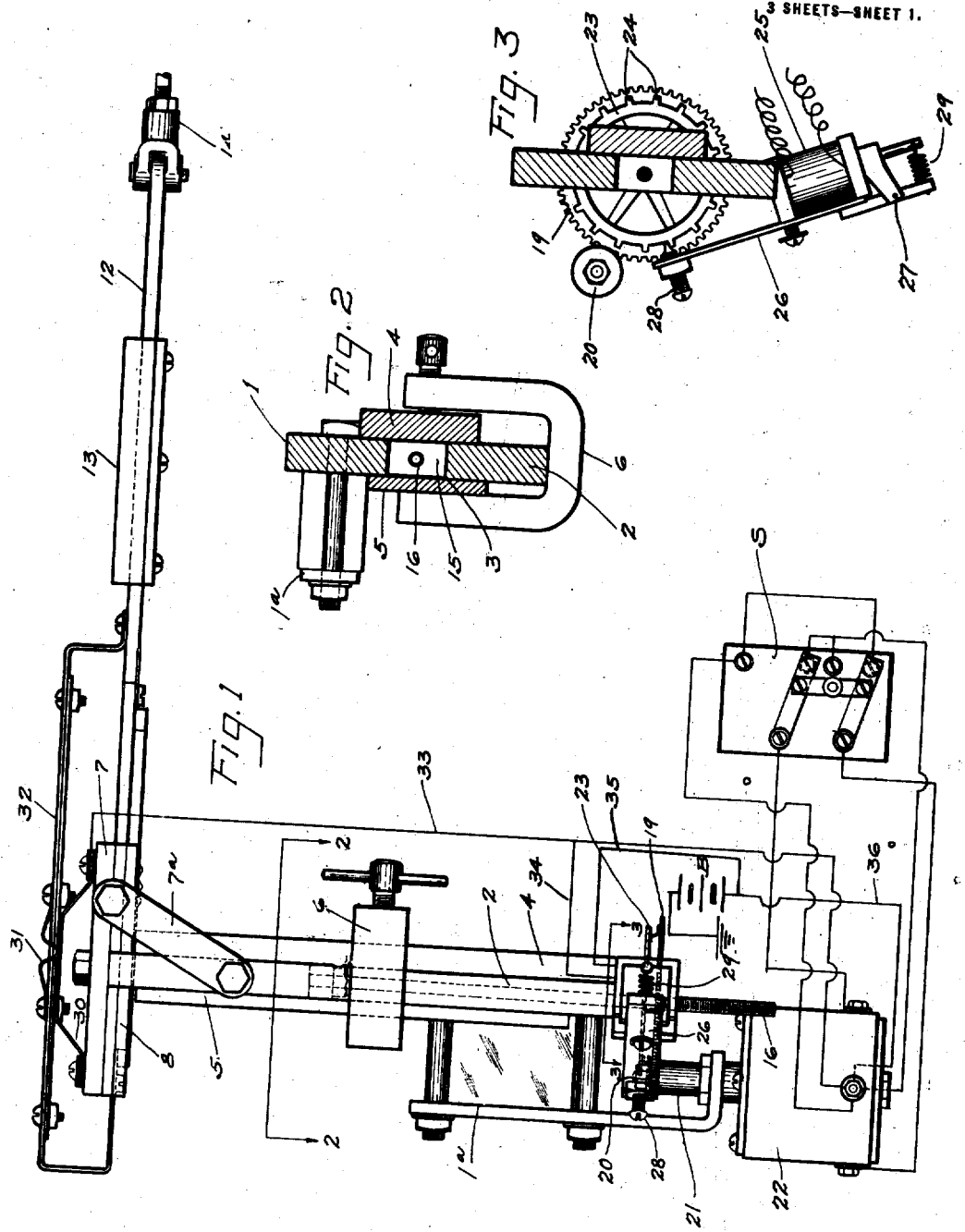

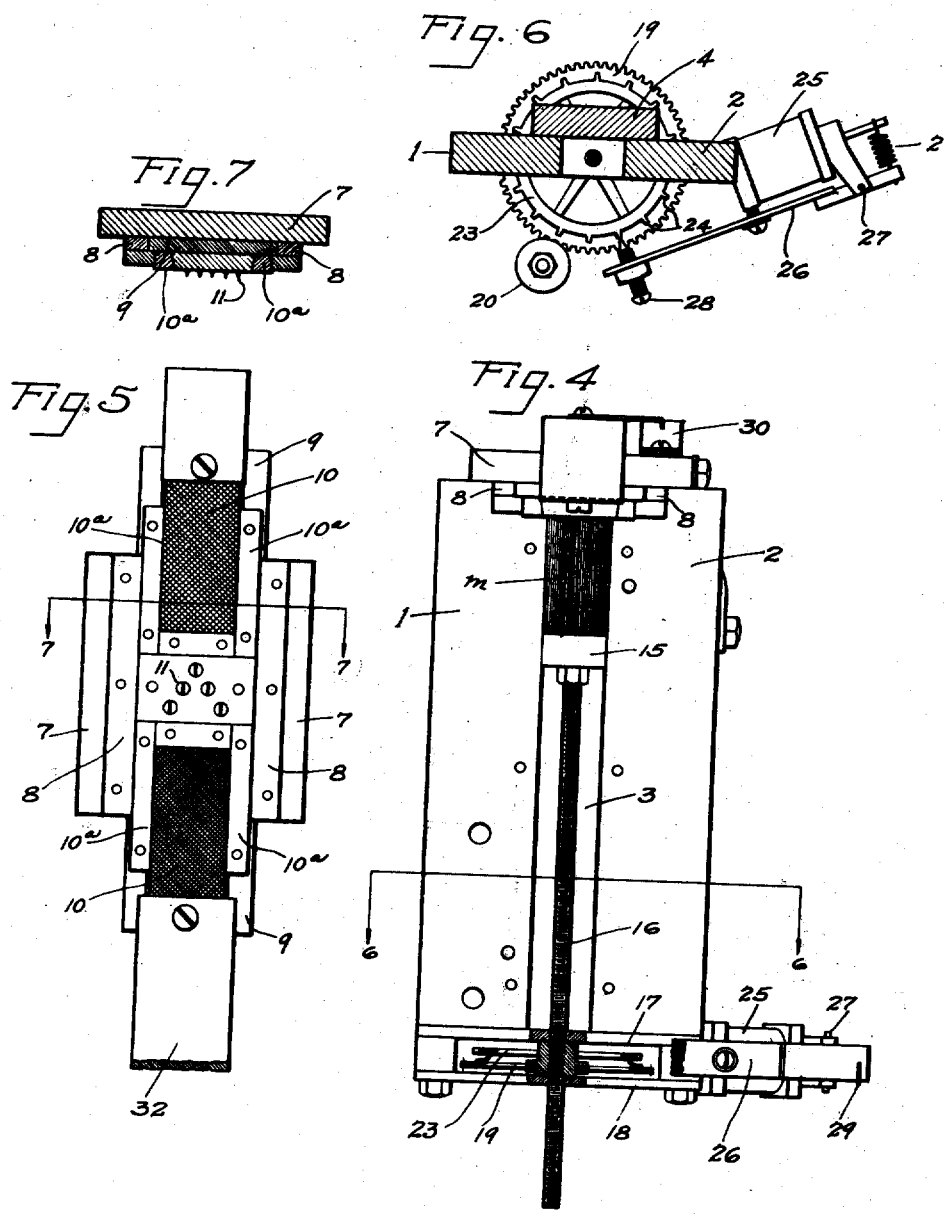

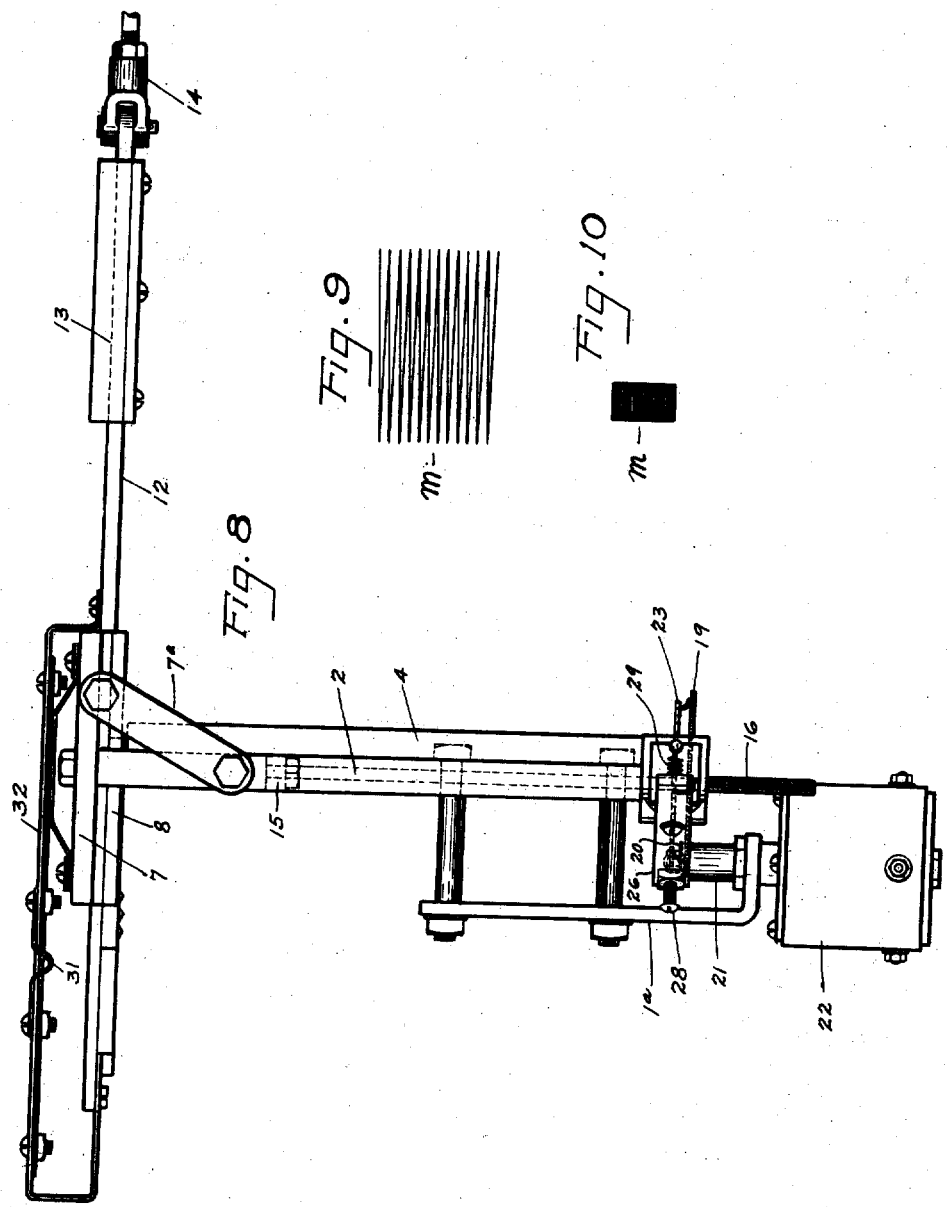

JOHN R. SIMPSON, OF TROY, OHIO.

DISINTEGRATING-MACHINE.

1,258,953.  Specification of Letters Patent.  Patented Mar. 12, 1918.

Application filed May 11, 1917. Serial No. 167,975.

*To all whom it may concern:*

Be it known that I, JOHN R. SIMPSON, a citizen of the United States, residing at Troy, in the county of Miami and State of Ohio, have invented certain new and useful Improvements in Disintegrating-Machines, of which the following is a specification.

This invention relates to disintegrating machines, and more particularly to a machine for disintegrating wire mesh or cloth.

The particular class of wire mesh or cloth which this machine is designed to operate upon is that used in paper making machinery in the form of endless belts upon which the pulp is deposited and carried thereby to the rolls. In course of time the warp wires of this endless wire mesh belt become worn and crystalized due to the continual travel and passing over and around the supporting rolls, while the cross or woof wires are subjected to very little wear. The material of the belt is cloth formed of copper or bronze wire and has been found useful for bearings and other purposes. It has been discovered, however, that if this wire mesh can be disintegrated into fine particles it not only puts it in a more desirable state to mix with babbitt for bearings but also renders it fit for use in other connections such for instance as commutator brushes or brazing material.

The object of the present invention is to devise a machine for disintegrating this wire mesh or cloth in an economical and effective manner, a more specific object being to disintegrate the mesh in a way to secure material containing pieces of wire that are limited as to length and of a slightly kinked nature, so that the pieces of wire will have a tendency to adhere to each other and maintain positions in all directions when placed under pressure so as to form a more secure anchorage in the material with which they are mixed.

In the accompanying drawings:—

Figure 1 is a side view of a machine embodying my improvements.

Fig. 2 is a section on the line 2—2 of Fig. 1.

Fig. 3 is a section on the line 3—3 of Fig. 1.

Fig. 4 is a front view of a portion of the machine.

Fig. 5 is a bottom plan of the disintegrating tool proper and its guide.

Fig. 6 is a section on the line 6—6 of Fig. 4.

Fig. 7 is a section on the line 7—7 of Fig. 5.

Fig. 8 is a side view showing the parts in a different position than that shown in Fig. 1 and with some of the parts omitted.

Figs. 9 and 10 are views of the material upon which the machine is designed to operate.

In the said drawings, 1 and 2 represent two vertically-arranged supports spaced apart so as to form a vertically-arranged channel 3, the rear side of which is closed by a permanently attached cover 4 and the front side of which is designed to be closed by a removable cover 5 held in position by a clamp 6, (Figs. 1 and 2). Bolted to the upper ends of these supports 1 and 2 is a plate 7, a brace 7ª (Fig. 1) being provided to more firmly secure the plate 7 in position, having on its lower side ways 8, see Fig. 7 for detail, the supports 1 and 2 being recesses to receive the same. Slidably mounted in these ways 8 is the disintegrating tool proper consisting of a plate 9 having connected with the lower side thereof tools 10 and 11. The tools 10 are in the nature of files and are inclosed by strips 10ª formed so as to provide a dove-tailed groove to receive these files as shown in Fig. 7. Between the files 10 and secured to the plate 9 is a small plate having projecting knives 11 five in number in the present case and all located in different planes as shown in Figs. 5 and 7. The tool thus formed has connected therewith a bar 12 arranged in the slide 13 and having connected therewith a pitman 14 so that the tool may be reciprocated back and forth from any suitable source of power.

The wire mesh, *m*, is preferably cut in strips of suitable width and folded upon itself a number of times so as to make a compact mass, see Figs. 9 and 10, which will fit in the channel 3 as shown in Fig. 4, and means are provided for feeding the material gradually in the path of the reciprocating tool. It might be explained at this point that the longitudinal wires or the warp of the mesh are the ones that receive the most wear in the work which the mesh receives on the paper making machinery, so that in preparing this mesh for disintegration, if certain definite lengths of severed cross-wires is desired, it is so folded that the cross wires or woof of the mesh will lie at right angles to the line of travel of the knives 11 so that these cross wires will be severed, as shown in Fig. 10. The file surfaces then, passing over the end of the mass after the knives, serve to drag out the severed pieces of the cross wires and also the longitudinal wires which because of their worn condition will readily break up into very fine particles. The wire cloth, however, may be rolled upon itself or arranged in any desired manner and subsequently pressed or squared to fit the vertically arranged channel 3. Upon each reciprocation of the tool proper, the mass of material is given an intermittent feed in the following manner:

Located in the channel 3 is a block 15 to which is connected a screwthreaded rod 16, the block and channel being square or rectangular in cross section so as to prevent the block and rod from turning. The lower end of the rod 16 extends through and has a bearing in two cross bars 17 and 18 which are secured to and connect the lower ends of the frame parts 1 and 2. Threaded on the rod between the cross bars is the hub of a gear wheel 19 which is in mesh with a pinion 20 (shown in dotted lines in Fig. 1) on the shaft 21 of an electric motor 22 supported from the bracket 1ª. Connected to the gear wheel 19 is a wheel 23 having a series of spaced teeth or projections 24 about the periphery thereof. Secured to one of the upright supports is a magnet 25 having an armature 26 pivoted at 27, the outer end of the armature provided with an adjustable stop pin 28. The spring 29 holds the stop pin 28 out of the path of the projections 24 as shown in Fig. 6 and when the magnet is energized and the armature attracted the stop pin 28 will be brought into the path of one of the projections 24 as shown in Fig. 3, so as to arrest the movement of the gear 19 and motor 22 which has been energized simultaneously with the energization of the magnet.

Means are provided for making and breaking the circuit through the magnet and motor by the reciprocating movement of the tool proper. Secured to but insulated from the plate 7 is a contact piece 30 over which wipes a contact 31 on the reciprocating tool holder, the contact 31 being secured to a bracket 32 one end of which is fastened to the under side of the plate 9 and the other to the connecting bar 12, this contact 31 being grounded. The wire 33 leads from contact 30 to the field of the motor, which in the present case is a series wound motor, and wire 34 leads to the magnet. The magnet and the motor are in circuit with a battery B through the wires 35 and 36. The operation of the device is as follows:—

With the block 15 at the lower end of the channel 3 the material, prepared in the manner stated, is placed in the channel with its upper end in contact with the reciprocating tool and the block 15 pressing against the lower end. As the tool reciprocates back and forth the knife blades sever the cross wires of the material and the file surfaces drag out the severed pieces of cross wire and also break up into fine particles the worn longitudinal wires, the disintegrated material dropping into a suitable receptacle (not shown). Each time the tool reciprocates a circuit is established through the motor and magnet, the operation of the motor turning the gear 19 through a space equal to the distance between adjacent teeth 24, the stop pin 28, upon the energization of the magnet, being brought into the path of one of the teeth and thus arresting the gear. It has been found in practice that the motor acts to turn the gear slightly before the magnet brings the stop pin into the path of the projection 24 which allows the tooth or projection 24 which has last come in contact with the stop to move out of its path. When all of the material in the channel 3 has been disintegrated the motor may be reversed by the reversing switch S and with the stop pin 28 held out of the path of the teeth 24, the head 15 will be moved back to the lowest point in the channel 3 so that a fresh supply of the material may be inserted in the channel.

While I have shown an electrically-operated start and stop mechanism for feeding the material intermittently into working position, yet the invention would contemplate the employment of mechanically operated feeding devices.

Having thus described my invention, I claim:

1. In a machine for disintegrating wire mesh which has been placed in a compact mass, a holder for the mesh, devices coöperating with said holder for disintegrating said mesh, and means for feeding said mesh to said devices.

2. In a machine for disintegrating wire mesh which has been placed in a compact mass, a holder for said mesh, devices for disintegrating said mesh coöperating with said holder, and means for intermittently feeding said mesh to said devices.

3. In a machine for disintegrating wire mesh which has been placed in a compact mass, a holder for said mesh, devices for disintegrating said mesh together with means for operating the same, and means for intermittently feeding said mesh to said devices, said feeding means being controlled by said devices.

4. In a machine for disintegrating wire mesh which has been placed in a compact mass, a holder for the mesh, devices coöperating with said holder for disintegrating said mesh, and means controlled by said devices for feeding said mesh to said devices.

5. In a machine for disintegrating wire mesh which has been placed in a compact mass, a holder for the mesh, devices coöperating with said holder for disintegrating said mesh consisting of severing blades and a roughened surface, and means for feeding said mesh to said devices.

6. In a machine for disintegrating wire mesh which has been placed in a compact mass, a holder for the mesh, devices coöperating with said holder for disintegrating said mesh consisting of a series of severing blades and a roughened surface on each side of said blades, and means for feeding said mesh to said devices.

7. In a machine for disintegrating wire mesh which has been placed in a compact mass, a holder for said mesh, cutting tools for severing one series of wires of the mesh into short lengths, tools for dragging out the severed pieces of wires and also for disintegrating the oppositely-extending series of wires, and means for feeding the mesh to said tools.

8. In a machine for disintegrating wire mesh which has been placed in a compact mass, a support having a channel open at one end to receive said compact mass of mesh, disintegrating tools arranged to be reciprocated back and forth across the open end of said channel, and means for feeding said mesh into contact with said tools.

9. In a machine for disintegrating wire mesh which has been placed in a compact mass, a support having a channel open at one end to receive said compact mass of mesh, disintegrating tools arranged to be reciprocated back and forth across the open end of said channel, and means for feeding said mesh into contact with said tools, said feeding means being controlled by said tools.

10. In a machine for disintegrating wire mesh which has been placed in a compact mass, a support having a channel to receive said mesh, disintegrating tools coöperating with said channel, a block in said channel, and means for feeding said block to force said mass of mesh into contact with said disintegrating tool.

11. In a machine for disintegrating wire mesh which has been placed in a compact mass, a holder having a channel to receive said mesh, disintegrating tools coöperating therewith, a block in said channel, a threaded rod fastened to said block, a gear threaded on said rod but confined against lateral movement, and means for operating said gear.

12. In a machine for disintegrating wire mesh which has been placed in a compact mass, a holder having a channel to receive said mesh, disintegrating tools coöperating therewith, a block in said channel a threaded rod fastened to said block, a gear threaded on said rod but confined against lateral movement, an electric motor operatively connected to said gear.

13. In a machine for disintegrating wire mesh which has been placed in a compact mass, a holder having a channel to receive said mesh, disintegrating tools coöperating therewith, a block in said channel, a threaded rod fastened to said block, a gear threaded on said rod but confined against lateral movement, an electric motor operatively connected to said gear, means for intermittently starting and stopping said motor.

14. In a machine for disintegrating wire mesh which has been placed in a compact mass, a holder for said mesh, disintegrating tools coöperating therewith, feeding mechanism for said mesh, and stop and start devices for controlling said feeding mechanism.

15. In a machine for disintegrating wire mesh which has been placed in a compact mass, a holder for said mesh, disintegrating tools coöperating therewith, electrically-operated devices for feeding said mesh, and start-and-stop mechanism for said devices.

16. In a machine for disintegrating wire mesh which has been placed in a compact mass, a holder for said mesh, disintegrating tools coöperating therewith, electrically operated devices for feeding said mesh, stop-and-start mechanism for said devices, said start-and-stop mechanism being controlled by said tools.

In testimony whereof, I have hereunto set my hand this 8th day of May, 1917.

JOHN R. SIMPSON.

Witnesses:
H. C. GOODRICH,
A. W. CLARK.

Copies of this patent may be obtained for five cents each, by addressing the "Commissioner of Patents, Washington, D. C."